United States Patent [19]

Nosetani et al.

[11] Patent Number: 5,334,814
[45] Date of Patent: Aug. 2, 1994

[54] ELECTRODE FOR SPOT WELDING

[75] Inventors: Tadashi Nosetani; Keizo Namba, both of Nagoya; Hiromichi Sano, Chiryu; Makoto Yonemitsu, Nagoya; Masaki Kumagai, Nagoya; Masanori Tsunekawa, Nagoya, all of Japan

[73] Assignee: Sumitomo Light Metal Industries, Ltd., Tokyo, Japan

[21] Appl. No.: 890,017

[22] Filed: May 27, 1992

[30] Foreign Application Priority Data

May 27, 1991 [JP] Japan .................. 3-151006
May 27, 1991 [JP] Japan .................. 3-151007

[51] Int. Cl.$^5$ .................. B23K 11/30; B23K 35/24
[52] U.S. Cl. .................. 219/119; 219/118; 420/471; 428/647
[58] Field of Search .................. 219/118, 119; 420/470, 420/471; 428/647, 674

[56] References Cited

U.S. PATENT DOCUMENTS

| | | | |
|---|---|---|---|
| 2,469,878 | 5/1949 | Hannon et al. | 428/647 |
| 4,401,874 | 8/1983 | Kitamura et al. | 219/118 |
| 4,972,047 | 11/1990 | Puddle et al. | 219/118 |

FOREIGN PATENT DOCUMENTS

| | | | |
|---|---|---|---|
| 49-36860 | 10/1974 | Japan | 219/118 |
| 114544 | 6/1985 | Japan . | |
| 2-251382 | 10/1990 | Japan . | |

*Primary Examiner*—Geoffrey S. Evans
*Attorney, Agent, or Firm*—Flynn, Thiel, Boutell & Tanis

[57] ABSTRACT

A spot welding electrode is made of a copper base material such as copper, copper alloy, or alumina dispersion strengthened copper, and has a Sn coating layer formed at the part making contact with the material being welded. The formed Sn coating layer reduces electrode wear and prolongs electrode life.

8 Claims, No Drawings

ELECTRODE FOR SPOT WELDING

FIELD OF THE INVENTION

This invention relates to a spot welding electrode, particularly to an electrode suitable for the spot welding of aluminum and aluminum alloys. In more detail, this invention provides an electrode for progressive spot welding of aluminum and aluminum alloy sheets for automobiles giving small wear at the electrode tip, a low degradation of strength at the welded part, and requiring only simple preliminary treatment of the aluminum and aluminum alloy members being welded.

BACKGROUND OF THE INVENTION

A spot welding electrode must have high electrical conductivity, high thermal conductivity, and superior high temperature strength. Accordingly, various precipitation hardening type copper alloys, such as chromium copper, zirconium copper, and zirconium chromium copper, have been widely used. Recently, an electrode of alumina dispersion strengthened copper, which disperses fine grain alumina into the copper base, has been brought into practical use to significantly improve heat resistance and deposition durability.

The above described spot welding electrodes are applied to the spot welding of aluminum and aluminum alloys (referred to simply as "aluminum" hereafter). When these electrodes are applied to a recent highly automated, high speed progressive aluminum spot welding work, abrasion resistance at the tip of electrode and the strength of the spot-welded part often become problems.

To solve these problems, unexamined Japanese Patent publication 63-260684 provided an electrode forming a thin metallic film, such as W, having a high hardness and high melting point thereon at the area contacting with the material being welded. The electrode is, however, expensive and has insufficient workability, and still leaves the problem of practical application.

Unexamined Japanese Patent publication 63-30185 proposed electrodes coated by Co base alloy and Cr base alloy at the tip thereof, and examined Japanese Patent publication 60-48275 proposed an Al-coated electrode at the tip thereof. However, Co and Cr have problems in cost and electrode durability. As for the Al-coated electrode, sufficient preliminary treatment of aluminum members being welded to remove oxide film therefrom is necessary to assure prolonged electrode life and sufficient strength at the welded part. Such removal of oxide film takes time, and, in some cases, requires use of a wire-brush for perfect removal of the film.

SUMMARY OF THE INVENTION

An object of this invention is to provide a spot welding electrode giving low wear at the tip thereof. Another object of this invention is to provide a spot welding electrode giving low wear at the tip thereof and low degradation of strength at the welded part under progressive spot welding. A further object of this invention is to provide a spot welding electrode suitable for the progressive spot welding of aluminum while requiring relatively simple preliminary treatment of the aluminum members to be welded.

The above described objects are achieved by forming a Sn coating layer on the spot welding electrode made of copper base materials at the area contacting with the member being welded. For example, the copper base material is copper, copper alloy, and alumina dispersion strengthened copper. For the case of copper or copper alloy, a known spot welding copper or copper alloy comprising hard copper, chromium copper, zirconium copper, or zirconium chromium copper is formed into an electrode tip shape, then the tip is coated with Sn. Sn coating is achieved either by plating, such as electroplating, electroless plating, displacement plating, and hot dipping, or by soldering. Even when the Sn coating layer contains a small amount of one or more of the elements selected from the group of Ag, B, Bi, Co, Cr, Fe, In, Mo, Ni, P, Sb, Te, Ti, Pb, Zr, and W, the effect of this invention is not affected.

The thickness of the Sn coating layer is preferably in a range of from 0.03 to 400 $\mu$m. Below 0.03 $\mu$m, the effect of Sn coating on the wear reduction at the tip of electrode becomes weak. Above 400 $\mu$m, the coating layer deforms during spot welding, and the shape of the electrode tip tends to become inappropriate.

Electrode durability is further improved by making the coated Sn diffuse into the electrode to Form an $\epsilon$ phase ($Cu_3Sn$) of intermetallic compound. The preferable heat treatment condition is a 200° C. or higher heating temperature and a 10 min. or longer heating time.

Alumina dispersion strengthened copper consists of dispersed alumina grains containing 0.05 wt. % or more of aluminum, preferably 0.05-1.7 wt. % of aluminum, and containing 50% or more of alumina in aluminum, with the balance of copper and unavoidable impurities.

To prepare a spot welding electrode tip of alumina dispersion strengthened copper, a Cu—Al alloy powder having the composition described above is subjected to internal oxidation by heating in an oxidizing atmosphere to an elevated temperature to convert the Al component into alumina ($Al_2O_3$) to form a dispersion strengthened copper powder in which the aluminum powder finely disperses into the copper base. Then, the dispersion strengthened copper powder is heated to reduce the excess copper oxides in a reducing atmosphere, as necessary, and is packed into a copper cylindrical container to carry out hot-extrusion and cold drawing into a rod having a predetermined diameter. Finally, the rod is machined, or machined after forging, to form the electrode.

After machining to the electrode tip shape, the tip is coated with Sn. Coating is performed either by plating, such as electroplating, electroless plating, displacement plating, and hot dipping, or by soldering. Even when the Sn coating layer contains a small amount of one or more of the elements selected from the group of Ag, B, Bi, Co, Cr, Fe, In, Mo, Ni, P, Sb, Te, Ti, Pb, Zr, and W, the effect of this invention is not affected.

The thickness of the Sn coating layer is preferably in a range of from 0.03 to 400 $\mu$m. Below 0.03 $\mu$m, the effect of Sn coating on the abrasion reduction at the tip of electrode becomes weak. Above 400 $\mu$m, the coating layer deforms during spot welding, and the shape of the electrode tip tends to become inappropriate. Electrode durability is further improved by making the coated Sn diffuse into the electrode to form an $\epsilon$ phase ($Cu_3Sn$) of intermetallic compound. The preferable heat treatment condition is a 200° C. or higher heating temperature and a 10 min. or longer heating time.

As described above, the Sn coating layer formed on the electrode tip reduces electrode wear and prolongs electrode life.

DETAILED DESCRIPTION OF THE PREFERRED EMBODIMENT

EXAMPLES

This invention is described in detail in the examples and comparative examples.

Example 1

Three types of spot welding electrodes having 16 mm outside diameters and 100 mm tip radiuses of curvature, R, were formed from the Cu—1 wt. % Cr alloy material. Each of the tips was coated with an Sn layer having a thickness of 0.06 μm and 3 μm by displacement plating and the thickness of 380 μm by hot dipping, separately.

Displacement plating was carried out by degreasing, washing with water, etching in an acid bath comprising sulfuric acid and nitric acid, washing with water, then plating in a bath of "SUBSTAR-SN"-P2, L2, prepared by Okuno Pharmaceutical Co., Ltd. at 60° C.

Hot dipping was carried out by degreasing the material followed by dipping into a molten Sn bath.

Example 2

The Sn-coated electrode tips were prepared by the same procedure in Example 1 to have 0.05 μm, 2 μm, and 370 μm of Sn layer thickness. They were heated to 200° C. for 5 hrs. in air to diffuse a portion of metallic Sn into the electrode. After heat treatment, microscopic observation of the section of each tip was carried out to confirm that the ε phase of an intermetallic compound of Cu—Sn alloy was formed in a part of the texture.

Example 3

Three types of spot welding electrodes having 16 mm in outside diameters and 100 mm tip radiuses of curvature, R, were formed from the Cu—1 wt. % Cr alloy material. Each of the tips was coated with an Sn layer having a thickness of 0.06 μm, 3 μm, and 380μ by soldering, separately. The soldering was carried out by heating the Sn solder placed on the tip surface with a flux using a torch to melt them to form an overlay.

Example 4

The Sn-coated electrode tips were prepared by the same procedure as in Example 3 to have 0.05 μm, 2 μm, and 370 μm of Sn layer thickness. They were heated to 200° C. for 5 hrs. in air to diffuse a portion of metallic Sn into the electrode. After heat treatment, microscopic observation of the section of each tip was carried out to confirm that the ε phase of an intermetallic compound of Cu—Sn alloy was formed in a part of the texture.

Comparative Example 1

Spot welding electrodes having 16 mm outside diameters and 100 mm tip radius of curvature, R, were formed from Cu—1 wt. % Cr alloy material. Each of the tips was coated with an Sn layer having a thickness of 0.02 μm by displacement plating using the same procedure as in Example 1, and having a thickness of 430 μm by hot dipping using the same procedure as in Example 1, separately.

Comparative Example 2

Sn coating layers each having 0.02 μm and 430 μ of thickness were formed on the tips of electrodes prepared by soldering using the same procedure as in Comparative example 1.

Comparative Example 3

Sn-coated electrode tips prepared by the same soldering procedure described in Comparative example 2 were heated to 200° C. for 5 hrs. to diffuse a portion of the metallic Sn into the electrode. After heat treatment, a section of each tip was observed under a microscope to confirm the formation of the ε phase of a Cu—Sn alloy intermetallic compound in a part of the texture.

The electrodes prepared in Examples 1 through 4 and Comparative examples 1 through 3 were subjected to the welding test described below to evaluate the durability thereof.

The employed members being welded were AA5083 alloy sheets (annealed material (O material), 1 mm of thickness) comprising 4.5 wt. % of Mg, 0.65 wt. % of Mn, 0.15 wt. % of Cr, with the balance of Al and unavoidable impurities. The applied preliminary treatment procedure consisted of degreasing by dipping into a commercially available solvent, washing with water, dipping into an alkali cleaner bath (sodium carbonate solution containing sodium silicate as the inhibitor, at 80° C.) for 5 min., washing with water, and drying.

Each pair of the electrodes prepared in Examples 1 through 4 and Comparative examples 1 through 3 were placed at the opposite position on both sides of the aluminum members being welded which had been preliminarily treated as described before. Progressive spot welding of 1000 cycles was carried out on those members using a three-phase low frequency spot welder under conditions of 2.2 KA of welding current (effective current), 0.083 sec. of weld time, 900 kgf of preliminary applied pressure, and 300 kgf of welding pressure. The tensile shear load at the spot welded part was measured after every 10 cycles of spot welding. The threshold number of spot welding cycles which showed just before the 171 kgf/point, JIS Z3140 grade A was measured and the tensile shear load at the spot welding part was also determined. Then, the tensile shear load at every spot welding part was measured after every 10 cycles of spot welding up to the determined threshold number of cycles, and the average value was calculated. Results are presented in Table 1.

Table 1 clearly shows that there is only a small degradation in the strength of the welded part in the progressive spot welding test, indicating that the electrodes of this invention have good performance applicable to progressive spot welding.

TABLE 1

| Embodiment | Sn coat thickness on electrode tip | Forming method of Sn coating layer | 1000 cycle progressive spot welding test Tensile shear load (kgf/point) Average | Min | Progressive spot welding test up to just before the tensile shear load at the spot welded part reaches 171 kgf/point Number of welding cycles | Average tensile shear load (kgf/point) |
|---|---|---|---|---|---|---|
| Example 1 | 0.06 | Displacement | 267 | 191 | 1312 | 265 |
|  | 3 | plating | 282 | 219 | 1534 | 271 |
|  | 380 | Hot dipping | 269 | 195 | 1256 | 264 |
| Example 3 | 0.06 | Soldering | 270 | 194 | 1423 | 268 |
|  | 3 |  | 287 | 224 | 1649 | 276 |
|  | 380 |  | 272 | 198 | 1367 | 267 |
| Example 2 | 0.05 | Displacement | 282 | 213 | 1903 | 279 |
|  | 2 | plating + Heat treatment | 294 | 245 | 2226 | 290 |
|  | 370 | Hot dipping + Heat treatment | 284 | 223 | 1752 | 280 |
| Example 4 | 0.05 | Soldering + | 285 | 216 | 2016 | 282 |
|  | 2 | Heat treatment | 299 | 250 | 2343 | 295 |
|  | 370 |  | 287 | 226 | 1865 | 283 |
| Comparative example 1 | 0.02 | Displacement plating | 258 | 143 | 792 | 260 |
|  | 430 | Hot dipping |  |  | Note |  |
| Comparative example 2 | 0.02 | Soldering | 257 | 142 | 791 | 259 |
|  | 430 |  |  |  | Note |  |
| Comparative example 3 | 0.02 | Soldering + | 256 | 141 | 790 | 258 |
|  | 430 | Heat treatment |  |  | Note |  |
| Control | No metallic Sn coating | — | 260 | 149 | 803 | 263 |

(Note)
The welding current heated the Sn coating layer and enhanced the deformation of the electrode tip. Also, the current density and applied pressure dropped below the necessary level and failed to form an adequate nugget, making it impossible to continue the welding.

Example 5

An Ar gas atomized powder of Cu—0.4 wt. % Al alloy was heated to 300° C. in air for 1 hr. to oxidize the powder surface, followed by heating to 800° C. for 5 hrs. to oxidize the inside of the powder. After being reduced in a hydrogen atmosphere at 500° C. for 1 hr., the powder was pulverized and then filled and enclosed in a Cu can. The can was then used as a billet for extrusion at 900° C. into a rod having a diameter of 30 mm. The rod was cold drawn to a diameter of 16 mm, from which electrodes each having 16 mm of outside diameter and 100 mm of radius of curvature, R, of tip were formed. Each of the tips was coated with a Sn layer having a thickness of 0.06 μm and 3 μm by displacement plating and having the thickness of 380 μm by hot dipping, separately.

Displacement plating was carried out by degreasing, washing with water, etching in an acid bath comprising sulfuric acid and nitric acid, washing with water, then plating in a bath of "SUBSTAR-SN"P2, L2, prepared by Okuno Pharmaceutical Co., Ltd. at 60° C. Hot dipping was carried out by degreasing the material followed by dipping into a molten Sn bath.

Example 6

Sn-coated electrode tips were prepared by the same procedure as in Example 1 to have 0.06 μm, 3 μm, and 380 μm of Sn layer thickness. Soldering was carried out by heating the Sn solder placed on the tip surface with a flux using a torch to melt them to form an overlayer.

Example 7

Sn-coated electrode tips were prepared by the same procedure as in Example 1 using displacement plating or hot dipping to have 0.05 μm, 2 μm, and 370 μm of Sn layer thickness. They were heated to 200° C. for 5 hrs. in air to diffuse a portion of Sn into the electrode. After the heat treatment, microscopic observation of the section of each tip was carried out to confirm that the ε phase of an intermetallic compound of Cu—Sn alloy was formed in a part of the texture.

Example 8

Sn-coated electrode tips were prepared by the same procedure as in Example 2 using soldering to have 0.05 μm, 2 μm, and 370 μm of Sn layer thickness. They were heated to 200° C. for 5 hrs. in air to diffuse a portion of Sn into the electrode. After the heat treatment, microscopic observation of the section of each tip was carried out to confirm that the ε phase of an intermetallic compound of Cu—Sn alloy was formed in a part of the texture.

Comparative Example 4

Sn-coated electric tips were prepared by the same procedure as in Example 1 using soldering to have 0.02 μm and 430 μm of Sn layer thickness.

The electrodes prepared in Examples 5 through 8 and in Comparative example 4 and the electrodes of alumina dispersion strengthened copper having the same composition with the electrode of Example 5 without Sn coating layer were subjected to the welding test described below to evaluate the durability of the electrodes.

The employed members being welded were AA5083 alloy plates (annealed material (O material), 1 mm of thickness), as described before. The applied preliminary treatment procedure consisted of degreasing by dipping the material into a commercially available solvent, washing with water, dipping into an alkali cleaner bath (sodium carbonate solution containing sodium silicate as the inhibitor, at 80° C.) for 5 min., washing with water, and drying.

the spot welding of aluminum plates. By using soldered Sn coating, repair of worn electrodes can be easily carried out, even at the site of spot welding.

TABLE 2

| Embodiment | Sn coat thickness on electrode tip | Forming method of Sn coating layer | 1000 cycle progressive spot welding test Tensile shear load (kgf/point) Average | Min | Progressive spot welding test up to just before the tensile shear load at the spot welded part reaches 171 kgf/point Number of welding cycles | Average tensile shear load (kgf/point) |
|---|---|---|---|---|---|---|
| Example 5 | 0.06 | Displacement | 269 | 193 | 2112 | 266 |
|  | 3 | plating | 288 | 225 | 2364 | 272 |
|  | 385 | Hot dipping | 271 | 197 | 2056 | 265 |
| Example 6 | 0.06 | Soldering | 273 | 197 | 2223 | 269 |
|  | 3 |  | 292 | 229 | 2479 | 277 |
|  | 380 |  | 275 | 201 | 2167 | 268 |
| Example 7 | 0.05 | Displacement | 284 | 215 | 2703 | 280 |
|  | 2 | plating + Heat treatment | 300 | 251 | 3056 | 291 |
|  | 370 | Hot dipping + Heat treatment | 286 | 225 | 2552 | 281 |
| Example 8 | 0.05 | Soldering + | 288 | 219 | 2816 | 283 |
|  | 2 | Heat treatment | 304 | 255 | 3173 | 296 |
|  | 370 |  | 290 | 229 | 2665 | 284 |
| Comparative example 4 | 0.02 430 | Soldering | 261 | 179 | 1163 Note | 257 |
| Control | No metallic Sn coating | — | 260 | 182 | 1156 | 253 |

(Note)
The welding current heated the Sn coating layer and enhanced the deformation of electrode tip, also the current density and applied pressure dropped below the necessary level and failed to form an adequate nugget, making it impossible to continue the welding.

Each pair of the electrodes were placed at the opposite position on both sides of the aluminum plates which had been preliminarily treated as described before. Progressive spot welding of 1000 cycles was carried out on those plates using a three-phase low frequency spot welder under conditions of 2.2 KA of welding current (effective current), 0.083 sec. of current application time, 900 kgf of preliminary applied pressure, and 300 kgf of welding pressure. The tensile shear load at the spot welded part was measured after every 10 cycles of spot welding. The threshold number of spot welding cycles which showed just before the 171 kgf/point, JIS Z3140 grade A, of the tensile shear load at the spot welding part was also determined. Then, the tensile shear load at every spot welding part was measured after every 10 cycles of spot welding up to the determined threshold number of cycles, and the average value was calculated. Results are presented in Table 2.

Table 2 clearly shows that there is only a small degradation in the strength of the welded part in the progressive spot welding test, indicating that the electrodes of this invention have good performance applicable to progressive spot welding.

As described above, the spot welding electrode of this invention solves the problems of rapid wear of electrode tip and strength degradation at the welded part during progressive, high speed spot welding operations. In particular, the electrode is preferable for use in

What is claimed is:

1. An electrode for spot welding of aluminum or aluminum alloys, said electrode consisting of a copper base material having a Sn layer of from 0.03 to 400 μm coated only on a tip end thereof.

2. The electrode of claim 1, wherein an ε phase of an intermetallic compound of a Cu—Sn alloy is formed at the interface of said copper base material and said Sn layer.

3. An electrode for spot welding of aluminum or aluminum alloys, said electrode consisting of a copper base material having a Sn layer of from 0.03 to 400 μm coated thereon and an ε phase of an intermetallic compound of a Cu—Sn alloy formed at the interface of the copper base material and the Sn layer.

4. The electrode of claim 3, wherein said Sn layer is a layer of Sn solder.

5. The electrode of claim 3, wherein said Sn layer is a layer of Sn plating.

6. The electrode of claim 3, wherein said copper base material is made of alumina dispersion strengthened copper.

7. The electrode of claim 3, wherein said Sn layer has a thickness of from 0.03 to 3 μm.

8. The electrode of claim 3, wherein said Sn layer is provided only on a tip end thereof.

* * * * *